(12) United States Patent
Rufes Bernad et al.

(10) Patent No.: US 11,964,837 B2
(45) Date of Patent: Apr. 23, 2024

(54) ASSISTED PRINT MEDIUM RECEIPT

(71) Applicant: Hewlett-Packard Development Company, L.P., Spring, TX (US)

(72) Inventors: Ezequiel Jordi Rufes Bernad, Sant Cugat del Valles (ES); Lluis Valles Casanova, Sant Cugat del Valles (ES); Joan Marti Velasco Figueras, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 241 days.

(21) Appl. No.: 17/312,099

(22) PCT Filed: Dec. 14, 2018

(86) PCT No.: PCT/US2018/065867
§ 371 (c)(1),
(2) Date: Jun. 9, 2021

(87) PCT Pub. No.: WO2020/122956
PCT Pub. Date: Jun. 18, 2020

(65) Prior Publication Data
US 2022/0024711 A1   Jan. 27, 2022

(51) Int. Cl.
*B65H 23/195* (2006.01)
*B41J 15/16* (2006.01)

(52) U.S. Cl.
CPC ............ *B65H 23/195* (2013.01); *B41J 15/16* (2013.01); *B65H 2403/92* (2013.01); *B65H 2515/70* (2013.01)

(58) Field of Classification Search
CPC ...... B41J 11/38; B65H 23/185; B65H 23/195; B65H 23/198; B65H 2403/92; B65H 2515/70; B65H 18/10; B65H 18/103; B65H 18/14; B65H 18/145; B65H 18/20; B65H 18/22; B65H 75/4484; B65H 75/4486
See application file for complete search history.

(56) References Cited

U.S. PATENT DOCUMENTS

| | | | |
|---|---|---|---|
| 4,456,201 A | 6/1984 | Frias et al. | |
| 4,740,732 A | 4/1988 | Way | |
| 5,366,303 A | 11/1994 | Barrus et al. | |
| 5,588,755 A | 12/1996 | Nimura | |
| 6,141,494 A | 10/2000 | Nishino et al. | |
| 6,823,132 B2 | 11/2004 | Saito et al. | |
| 6,854,907 B2 | 2/2005 | Perez et al. | |
| 7,682,094 B2 | 3/2010 | McNestry et al. | |
| 9,770,930 B2 | 9/2017 | Hart et al. | |
| 10,023,418 B2 | 7/2018 | Asai et al. | |
| 2002/0172511 A1 | 11/2002 | Saito et al. | |

(Continued)

FOREIGN PATENT DOCUMENTS

| | | |
|---|---|---|
| CN | 101143525 A | 3/2008 |
| CN | 102375382 A | 3/2012 |

(Continued)

*Primary Examiner* — Daniel J Colilla

(57) ABSTRACT

A method of operating a device to receive a print medium is disclosed. Rotation of a receiving device to receive a print medium is detected, whereby the rotation is caused by an external force. An assisting force is applied to further rotate the receiving device in response to the detected rotation.

13 Claims, 11 Drawing Sheets

(56) References Cited

U.S. PATENT DOCUMENTS

| | | | |
|---|---|---|---|
| 2005/0024462 A1* | 2/2005 | Yoshikaie | B41J 13/103 347/104 |
| 2009/0016797 A1 | 1/2009 | Brugue et al. | |
| 2010/0196076 A1* | 8/2010 | Castells | B41J 15/02 400/619 |
| 2017/0088384 A1 | 3/2017 | Asai et al. | |

FOREIGN PATENT DOCUMENTS

| | | | |
|---|---|---|---|
| CN | 102407689 A | | 4/2012 |
| CN | 102873995 A | | 1/2013 |
| EP | 1660332 B1 | | 3/2008 |
| JP | 2005-255336 A | | 9/2005 |
| JP | 2013-216474 A | | 10/2013 |
| JP | 2013-220087 A | | 10/2013 |
| JP | 2013216474 A | * | 10/2013 |
| JP | 2016222435 A | * | 12/2016 |
| WO | WO-2004025425 | | 3/2004 |

* cited by examiner

ASSISTED PRINT MEDIUM RECEIPT

BACKGROUND

Some printing devices employ a system to receive a print medium after passing a print zone. For example, the system may allow the print medium to be rolled up on a take up reel after a printing process. Print medium receipt may be electrically supported.

DESCRIPTION OF THE EXAMPLES

In the following, examples of a method and a device are described that may allow for receiving a print medium in a customizable manner in terms of time and force. The expression "receiving the print medium" may refer to a process of placing and arranging the print medium in a predefined and organized manner. For example, the receiving of a print medium may comprise retrieving, collecting, loading, depositing, mounting, accumulating, storing, keeping, stocking, maintaining, or the like, of the print medium. The examples as described herein may further allow for providing the received print medium. For example, the print medium may be received such as to be disposed for a subsequent process of removing, unloading, dispensing, withdrawing, extracting, displacing, packaging, or the like. In a specific example, the receiving of the print medium may include rolling up print medium on a core using a roller. One example of a roller is a take up reel.

Figure 1:
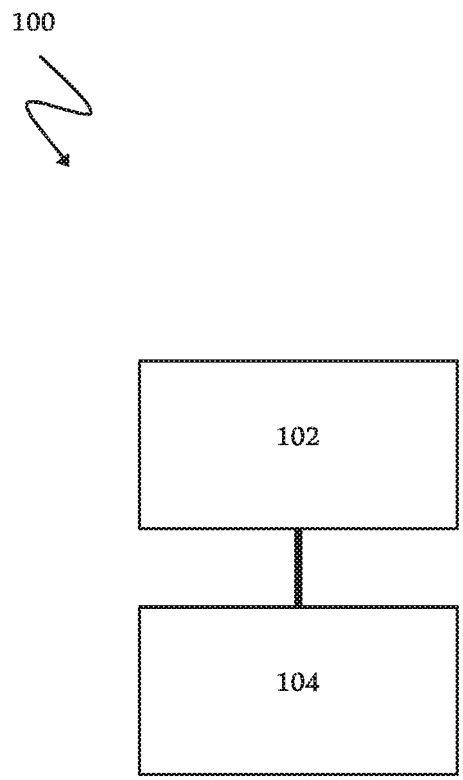
FIG. 1 is a flow diagram of a method of operating a receiving device according to an example.

FIG. 1 shows an example of a method 100 of operating a receiving device to receive a print medium. At 102, rotation of a receiving device is detected. Detecting the rotation may include detecting that the rotation is caused by an external force. At 104, an assisting force is applied to further rotate the receiving device in response to the detected rotation.

The print medium may be provided as a sheet of a material having a surface on which a print fluid may be deposited. The material of the print medium may include, for example, paper or another material of a plant origin, a material of an animal origin, a mineral material, a synthetic material such as nylon, polyester, or the like, woven or non-woven textile, or any combination thereof. In some examples, the print medium may be flexible such as to be foldable to a stack and/or rollable to a roll.

The receiving device may be a device allowing for receiving the print medium in any way as described above. For example, the receiving device may be arranged such as to receive the print medium advancing from an output of a printing device after undergoing a printing process. In some examples, the receiving device may allow the print medium to be placed and/or arranged in a predefined and organized manner. In a specific example, the receiving device may operate to roll the print medium on a roller, such as a take up reel.

The receiving device or a part thereof may be rotatable. The receiving device may be able to rotate upon itself, i.e. to perform a spin. In some examples, the receiving device may rotate to receive the print medium. For example, the receiving device may comprise a roller on which the print medium can be wound. In such an example, the print medium may be fixed to the receiving device prior to the receiving device starting rotating.

The rotation of the receiving device may be caused by an external force. External force may refer to a force received from a source that is outside of a device, apparatus or system which the receiving device is part of, included in, or engaged with. In particular, the external force may exclude an electric, magnetic or electromagnetic drive mechanically coupled to the receiving device. For example, the external force may refer to a manual force exerted by a user. Accordingly, a user may interact with the receiving device such as to cause the receiving device to rotate, thereby causing rotation of the receiving device by an external force.

The rotation of the receiving device caused by the external force may be detected in response to a position of the receiving device being offset from a previous position, with the offset not caused by a drive system coupled to the receiving device. Alternatively or additionally, the rotation of the receiving device caused by an external force may be detected in response to a rotational speed of the receiving device exceeding zero or a predefined value.

When detecting the rotation of the receiving device, it may be further determined whether the rotation of the receiving device is caused by an external force. In some examples, the receiving system may be coupled to a drive, which for example may include an actuator or an electric motor. In such examples, it may be determined whether the detected rotation of the receiving device is at least partially caused by the drive. For this purpose, it may be determined whether the drive is operating, and if so, a current operating state of the drive may be determined. For example, it may be determined whether the actuator or electric motor is powered, and if so, a current rotational speed of the actuator or electric motor may be determined. If the drive is found to be operating, it may be determined whether the detected rotation of the receiving device corresponds to the current operating state of the drive. If not, the detected rotation of the receiving device may be determined to be caused by an external force.

The assisting force may be received from a drive that is inside of a device, an apparatus or system which the receiving device is part of, included in, or engaged with. In particular, the assisting force may be received from an electric, magnetic or electromagnetic drive that is mechanically coupled to the receiving device. In a specific example, the assisting force may be exerted by an electric motor mechanically coupled to the receiving device. Accordingly, according to an example of the method, an electric motor may be provided to generate the assisting force. The electric motor may be brushless DC motor, brushed DC motor or stepping motor, for example. In the following, the term actuator is used for a drive to drive the receiving device, unless otherwise indicated.

Accordingly, the example as described herein may provide an automated process for supporting a receiving process of a print medium by an assisting force in response to an external force driving the receiving device. For example, a manual force driving the receiving device may be supported by an electromagnetic force, in response to detecting the manual force or the rotation caused by the manual force.

Figure 2:
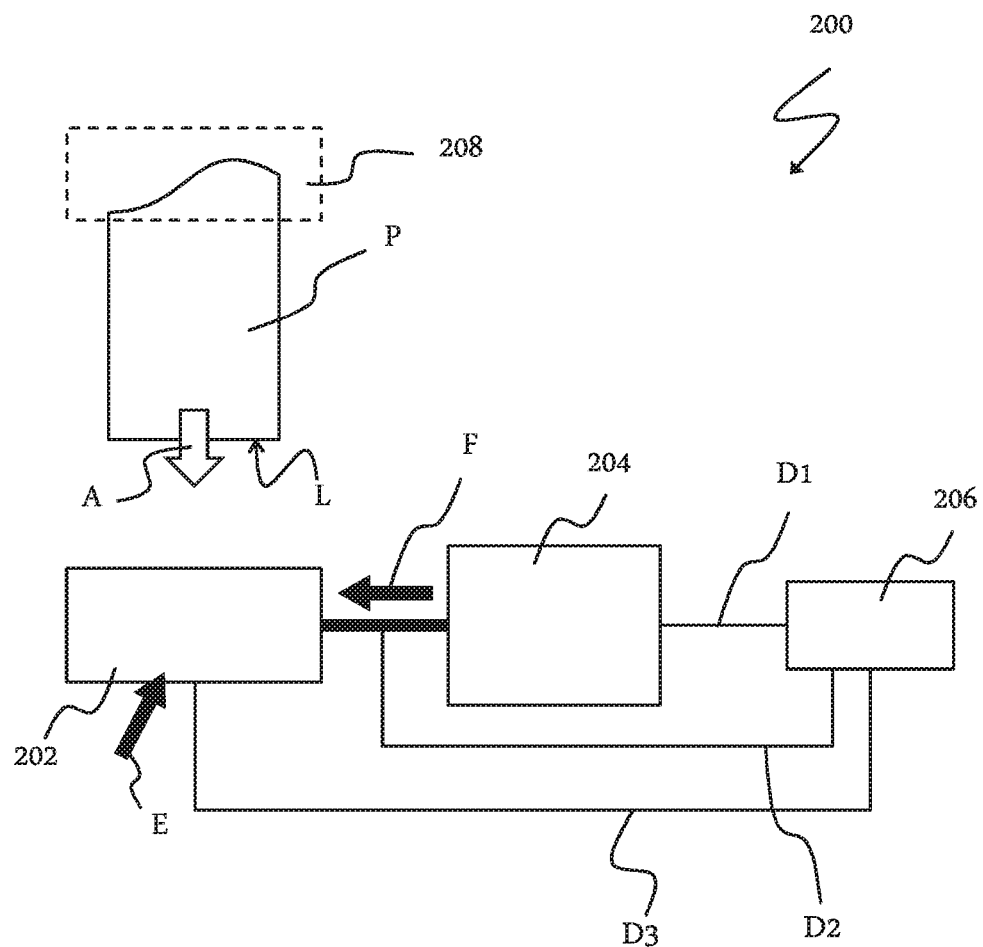
FIG. 2 is a schematic diagram of a device according to an example.

FIG. 2 schematically shows a device 200 according to an example. In particular, the device 200 may be able to carry out the method 100 as described above.

The device 200 comprises a receiving device 202, an actuator 204 and a control unit 206. The device 200 may be able to receive a print medium P. For example, the device 200 may be capable of placing and arranging the print medium P in a predefined and organized manner. For example, the device 200 may retrieve, collect, load, deposit, mount, accumulate, store, keep, stock, maintain, or the like, the print medium P. The device 200 may further comprise a print zone 208, in which a print fluid is to be deposited onto the print medium P.

The receiving device 202 may receive a print medium P. The receiving device 202 may be arranged such as to receive the print medium P advancing along an advance direction A. In an example, the receiving device 202 may be arranged at an output of the print zone 208, and the print medium P may be advanced from the print zone 208 towards the receiving device 202.

The receiving device 202, or a part thereof, may be rotatable. In particular, the receiving device 202 may be rotatable around a rotation axis through its center of mass, and thereby rotate upon itself or spin. The receiving device 202 may receive the print medium P while rotating. For example, the receiving device 202 may comprise a roller. The print medium P may be rolled up on the roller of the receiving device 202 while the receiving device 202 rotates.

In some examples, the print medium P may advance along the advance direction A towards the receiving device 202. When the print medium P has advanced such as to be located in vicinity of the receiving device 202, a leading edge of the print medium P may be fixed to the receiving device 202. Then the receiving device 202 may be rotated to roll up the print medium P. In some examples, the leading edge of the print medium P may be linear and aligned to the rotation axis of the receiving device 202 prior to be fixed thereto. In some examples, a core (not shown in the drawings) may be mounted on the receiving device 202 prior to fixing the print medium P. By rotating the receiving device 202, the print medium P may be rolled up on the core.

The actuator 204 may apply an assisting force F to the receiving device 202 In a specific example, the actuator 204 may comprise an electric motor. Accordingly, the electric motor may be operable according to a driving voltage applied to the electric motor. A torque generated by the motor may depend on a voltage that is applied to the electric motor of the actuator 204. The torque generated by the actuator 204 may correspond to the assisting force F.

The actuator 204 may be mechanically coupled to the receiving device 202. The actuator may be arranged such as to generate a torque that is, or at least has a component, parallel to the rotation axis of the receiving device 202. The actuator 204 and the receiving device 202 may be coupled to each other via a shaft to transmit the torque generated by the actuator 204 to the receiving device 202. The torque generated by the actuator 204 may be used to drive the receiving device 202. In this manner, the actuator 204 may apply the assisting force F to rotate the receiving device 202.

In some examples, a gear unit (not shown in the drawings) may be coupled between the receiving device 202 and the actuator 204. The gear unit may transmit rotation of the actuator 204 to the receiving device 202 and adjust the drive speed. Transmission of rotation of the actuator may be bidirectional. Accordingly, the gear unit may drive the receiving device 202 to wind and rewind print medium on the receiving device, for example to load and unload the print medium P.

The control unit 206 may control the actuator 204 in the above described manner. Furthermore, the control unit 206 may be able to detect motion of the receiving device 202, in particular a rotation of the receiving device 202 caused by an external force E. The control unit 206 may operate the actuator 204 in response to detecting the rotation of the receiving device 202 caused by an external force E.

The external force E may be defined as described above and in particular a manual force exerted by a human user. The external force E may be applied to the receiving device 202 to rotate the receiving device 202. The control unit 206 may detect the rotation of the receiving device 202 in response to an angular position of the receiving device 202 being offset from a previous position. The angular position may refer to an angular offset of the receiving device 202 from a reference position. The previous position may refer to a position of the receiving device 202 at a time point in the past, or at a defined reference time point. For example, the previous position may refer to a first position in time, a second position time, etc., that are stored over a given time period. Additionally or alternatively, positions of the receiving device may be stored over a given time period, and the stored positions may be compared to one another in order to determine whether a most current position deviates from the previously stored position(s).

In some examples, the actuator 204 comprises an electric motor, which is mechanically coupled to the receiving device 202 such that a rotor of the electric motor rotates with the receiving device 202, and vice versa. Accordingly, an external force E rotating the receiving device 202 may cause the rotor of the electric motor to rotate, thereby inducing a voltage caused by the rotation of the rotor of the electric motor relative to a stator of the electric motor according to the electromotive force. The motion of the electric motor may refer to the motion of the rotor relative to the stator of the electric motor. Accordingly, the control unit 206 may detect the rotation of the receiving device 202 by detecting a rotation of the electric motor of the actuator 204 caused by the external force E. This may occur, for example, if the electric motor rotates without the being powered, or if the detected rotation in terms of torque and/or rotational speed exceeds the rotation to be expected from a current operating state of the electric motor. This is illustrated by a connecting line D1 in FIG. 2.

For example, the control unit 206 may be able to detect this induced voltage to determine that the receiving device 202 has been rotated. In another example, rotation of the electric motor may be detected optically or electromagnetically, for example using an encoder or a sensor, such as Hall sensors, provided within the electric motor. The electric motor may be a direct-current motor, such as a brushed motor, brushless motor, or a stepper motor. In another example, the electric motor may be an alternate-current motor, such as a polyphaser motor, synchronous motor, or asynchronous motor.

Additionally or alternatively, the control unit 206 may be able to detect a motion of a mechanical coupling, e.g. a shaft and/or gear unit, between the receiving device 202 and the actuator 204. In response to the receiving device 202 being rotated by the external force E, the rotation of the receiving device 202 may be transmitted to the actuator 204 through the mechanical coupling. Accordingly, the control unit 206 may detect the rotation of the receiving device 202 by detecting a motion of the mechanical coupling, as illustrated by a connecting line D2 in FIG. 2. Additionally or alternatively, the control unit 206 may be able to detect the rotation of the receiving device 202 in a direct manner, which is illustrated by a connecting line D3 in FIG. 2. A sensor and/or an encoder can be provided for detecting motion of the mechanical coupling or rotation of the receiving device, for example.

Figure 3:
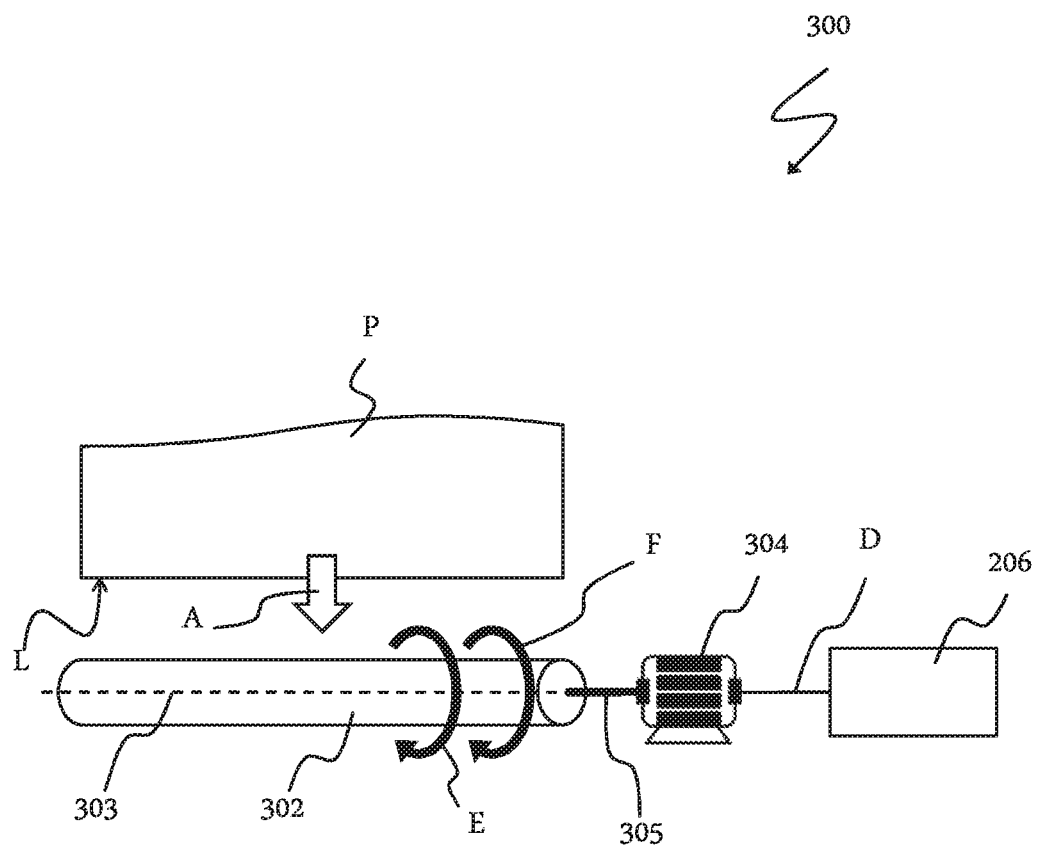
FIG. 3 is a schematic diagram of a device according to an example.

FIG. 3 schematically shows a device 300 according to a further example. The device 300 may be able to carry out the method 100 as described above. In FIG. 3, same reference signs are used as in FIG. 2 to indicate identical or similar functional and structural features. Unless otherwise indicated, the device 300 comprises all the features of the device 200 as described above with reference to FIG. 2.

The device 300 may comprise a roller 302, which may form part of a receiving device, in particular the receiving device 202 as described above with reference to FIG. 2. The roller 302 may have a cylindrical shape along its rotation axis 303. The roller 302 may be rotatable around the rotation axis 303. The roller 302 may be arranged such that its rotation axis is arranged parallel to a leading edge L of the print medium P.

The device 300 further comprises an electric motor 304 to generate an assisting force F. The electric motor 304 may be part of an actuator, in particular the actuator 204 as described above with reference to FIG. 2. The electric motor 304 may be mechanically coupled to the roller 302. For example, a shaft 305 may connect the roller 302 and the electric motor 304 to allow transmission of torque therebetween.

The electric motor 304 may be operated to generate a torque while consuming electric power. The torque generated by the electric motor 304 may be a function of a voltage that is applied to the electric motor 304. Accordingly, a rotational speed of the electric motor 304 may be controlled by controlling the voltage applied to the electric motor 304. This voltage may be referred to as a driving voltage.

The rotational speed of the electric motor 304 may change according to the voltage applied to the electric motor 304 in a manner characteristic for a respective electric motor 304. The corresponding mathematical relation between the rotational speed of the electric motor 304 and the applied voltage may be referred to as a characteristic function of the electric motor 304.

The characteristic function of the electric motor 304 may be described as the applied voltage being a sum of an ohmic term, an inductive term and an electromotive term. For example, the characteristic function may be described as follows:

$$V = I \cdot R + L \cdot \frac{\partial I}{\partial t} + K \cdot n$$

wherein V is the applied voltage, I is current through the electric motor 304, R is the rotor resistance of the electric motor 304, L is the inductance of the electric motor 304, t is time, K is a motor specific constant and n is the rotational speed of the electric motor.

Assuming a stationary operation, the inductive term eliminates. I is a function of a torque generated by the electric motor 304 and remains approximately constant in a stationary operation with constant load torque. Hence, the ohmic term is constant, and may be replaced by a constant C, thereby obtaining the following equation:

$$V = C + K \cdot n$$

Figure 5:
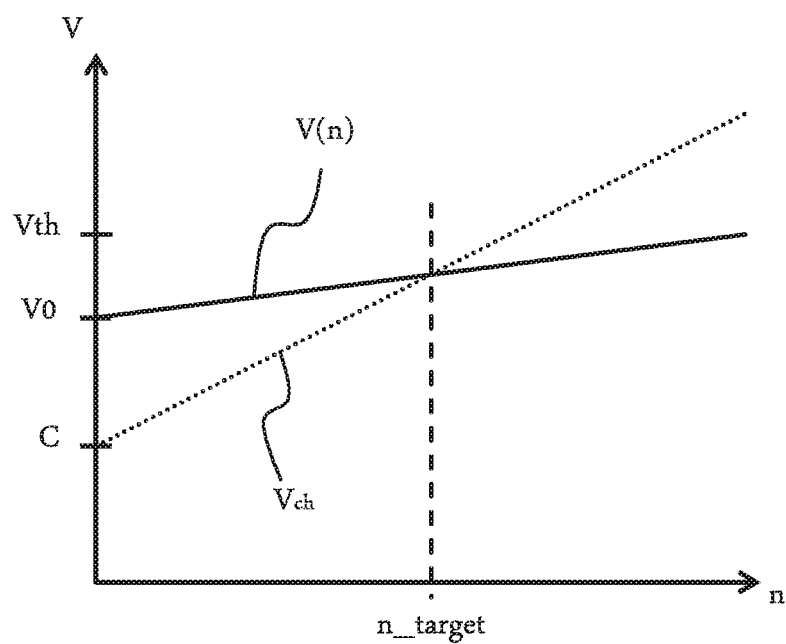
FIG. 5 is a schematic diagram of a voltage applied to an electric motor as a function of a rotational speed of the electric motor according to an example.

Accordingly, the voltage applied to the electric motor 304 may be approximated by a linear function of the rotational speed of the electric motor 304, as shown by a characteristic voltage curve Vch in FIG. 5. In FIG. 5, the vertical axis indicates the voltage V applied to the electric motor 304, and the horizontal axis indicates the rotational speed n of the electric motor 304. The characteristic voltage curve Vch intersects the vertical axis at C, which corresponds to a product of electric current and the ohmic resistance of the electric motor, as discussed above. The characteristic voltage curve Vch has a positive linear slope according to the constant K. A minimum voltage for starting the electric motor 304, however, will be higher than the constant C to overcome static resistance and inertia to cause the electric motor 304 to rotate. For example, a threshold voltage Vth may be necessary.

The threshold voltage Vth of the electric motor 304 may refer to the minimum voltage to be applied to the electric motor 304 that is sufficient for the electric motor 304 to switch from a non-moving state to a moving state. The threshold voltage Vth may depend on a total momentary inertia of the electric motor 304 as well as on a total static friction opposite a motion of the electric motor 304. In particular, the threshold voltage Vth may be determined by at least one of the following: an ohmic resistance of the electric motor 304, electromagnetic inertia of the electric motor 304, rotational inertia of the electric motor 304, or static friction of the electric motor 304. In addition, the threshold voltage Vth may further depend on a load torque on the roller 302. In examples in which the electric motor 304 is mechanically coupled to a receiving device, such as the roller 302, total static frictions and total inertias of the receiving device, including the roller 302, may also be taken into account for the determination of the threshold voltage Vth. Furthermore, also a transmission loss of the torque from the electric motor 304 to the roller 302 may be taken into account for the determination of the threshold voltage Vth.

Figure 4:
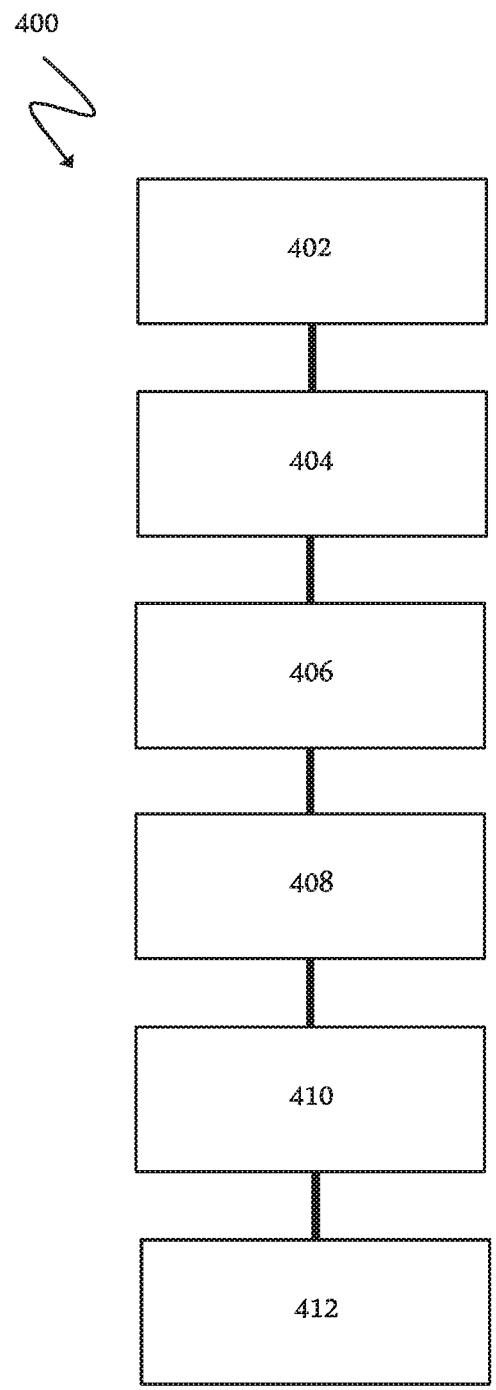
FIG. 4 is a flow diagram of a method of operating a receiving device according to an example.

FIG. 4 shows an example of a method 400 for operating the device 300 according to an example. At 402, the roller 302 may be provided as a receiving roller to receive the print medium P. Further at 402, the electric motor 304 may be provided as an actuator to rotate the roller 302. The electric motor 304 may set in motion when powered at least by the threshold voltage Vth, as shown in FIG. 5. In the following, the terms roller 302 and the receiving device 202 may be used interchangeably, unless otherwise indicated. Also, the terms electric motor 304 and the actuator 204 may be used interchangeably, unless otherwise indicated.

At 404, a bias voltage V0 may be applied to the electric motor 304. In particular, the bias voltage V0 may be applied before detecting the rotation of the receiving device 202 or before detecting the motion of the electric motor 304. In some examples, the bias voltage V0 may be applied while the electric motor 304 is in a non-moving state. In other examples, the bias voltage V0 may be permanently applied to the electric motor 304.

The bias voltage V0 may be below the threshold voltage Vth. In particular, bias voltage V0 may be a parameter adjusted to be below the threshold voltage Vth in order to prevent a spontaneous motion of the electric motor 304 and/or the roller 302. Accordingly, the bias voltage V0 may be customizable taking into account some physical parameters of the electric motor 304 and, if applicable, the roller 302. For example, the bias voltage V0 may be determined based on at least one of the following: an ohmic resistance of the electric motor 304, electromagnetic inertia of the electric motor 304, rotational inertia of the electric motor 304, or static friction of the electric motor 304. In addition, the bias voltage V0 may further depend on a load torque on the roller 302.

If no bias voltage V0 was applied, an external force E corresponding to the full magnitude of the threshold voltage Vth would be necessary to set the electric motor 304 in motion. Applying the bias voltage V0 reduces the amount of external force for starting the electric motor 304. Referring to FIG. 5, a external force E corresponding to a difference between Vth and V0 suffices to set the electric motor 304 in motion. Accordingly, the process of setting the electric motor 304 in motion may be facilitated.

In particular, the bias voltage V0 may be set so as to prevent a spontaneous motion of the electric motor 304 or the roller 302. For this purpose, the bias voltage V0 may be set reasonably below the threshold voltage Vth. For example, the bias voltage V0 may be 20% to 99% of the threshold voltage Vth. In further examples, the bias voltage V0 may be 30% to 90%, or 40% to 80% of the threshold voltage Vth.

When the print medium P, respectively its leading edge L, has reached the roller 302, the leading edge L of the print medium P may be fixed to the roller 302. An adhesive, tape, clip, hook-and-loop fastener, or the like may be used to fix the leading edge L to the roller 302.

After the leading edge L of the print medium P has been fixed to the roller 302, the external force E may be applied to rotate the roller 302. The external force E may be applied by a human user exerting manual force on the roller 302.

Referring to FIG. 4, rotation of the roller 302 caused by the external force E may be detected at 406. The detecting of the rotation of the roller 302 may be performed as described above. In particular, the rotation of the roller 302 may be transmitted through the shaft 305 to the electric motor 304. A rotor of the electric motor 304 may be rotated by the transmitted torque from the rotation of the roller 302. The motion of the rotor of the electric motor 304 relative to a stator of the electric motor 304 may induce a voltage according to the electromotive force. The control unit 306 may detect this induced voltage and, in response, detect the rotation of the roller 302. Alternatively or additionally, the control unit 306 may employ a sensor or an encoder to detect motion of the electric motor 304 and thus the rotation of the roller 302 caused by the external force E.

The control unit 306 may determine whether the rotation of the roller 302 is caused by the external force E. For this purpose, the control unit 306 may determine whether the detected rotation of the roller 302 is at least partially caused by the electric motor 304. Accordingly, the control unit 306 may determine whether the electric motor 304 is operating, and if so, determine a current rotational speed of the electric motor 304. The control unit 306 may further determine whether the detected rotation of the roller 302 corresponds to the current rotational speed of the electric motor 304. If not, the control unit 306 may determine that the detected rotation of the roller 302 is caused by an external force.

At 408, in response to detecting the rotation of the roller 302 by the external force, a driving voltage V(n) may be applied to the electric motor 304 to generate the assisting force F to further rotate the roller 302. For example, the driving voltage V(n) to be applied to the electric motor 304 may be determined as a function of a current rotational speed n of the electric motor 304. In some examples, the driving voltage V(n) may be greater than the constant C regardless of the rotational speed n of the electric motor 304 to keep the electric motor 304 in motion.

At 410, a current rotational speed of the roller 302 may be determined, for example by the control unit 306. In particular, the current rotational speed of the roller 302 may be determined by determining the current rotational speed n of the electric motor 304. For example, the current rotational speed n of the electric motor 304 may be determined by counting commutations of the rotor of the electric motor 304 per time unit, by counting revolutions of the rotor of the electric motor 304 per time unit, by measuring the angular offset of the rotor of the electric motor per time unit, or a combination thereof.

Additionally or alternatively, the current rotational speed of the roller 302 may be determined directly, for example, by counting revolutions of the roller 302 per time unit. In further examples, the current rotational speed of the roller 302 may be determined at the shaft 305 by counting the revolutions of the roller 302 or the electric motor 304 per time unit. In a specific example, the roller 302 and the electric motor 304 may be mechanically coupled such that the rotational speed of the roller 302 and the rotational speed of the electric motor 304 are identical.

At 412, the driving voltage V(n) may be controlled according to a predefined function of the current rotational speed of the roller 302. In a specific example, the driving voltage V(n) may be controlled according to a predefined function of the current rotational speed n of the electric motor 304. In particular, the predetermined function may differ from the characteristic function Vch of the electric motor 304. Generally, the driving voltage V(n) exceeding the characteristic function Vch at a given rotational speed may cause the rotational speed n of the electric motor 304 to increase; the driving voltage V(n) being below the characteristic function Vch at a given rotational speed may cause the rotational speed n of the electric motor 304 to decrease.

In some examples, the control unit 306 may control the electric motor 304 to operate the roller 302 at a target rotational speed n_target. In a specific example, the bias voltage V0 may be greater than the constant C, and the driving voltage V(n) may be controlled to increase linearly with the rotational speed n of the electric motor 304 increasing, wherein the linear increase of the driving voltage V(n) is smaller than the linear increase of the characteristic function Vch of the electric motor 304, as illustrated in FIG. 5. In this specific example, the control unit 306 may control the driving voltage V(n) to be above a voltage value according to the characteristic function Vch at the given current rotational speed n of the electric motor 304, if the current rotational speed n of the electric motor 304 is below the target rotational speed n_target.

Further in this specific example, if the current rotational speed n of the electric motor 304 is above the target rotational speed n_target, the control unit 306 may control the driving voltage V(n) to be below a voltage value according to the characteristic function Vch at the given current rotational speed n of the electric motor 304.

In a specific example, the driving voltage V(n) may be controlled according to a linear function of the current rotational speed n of the electric motor 304. In FIG. 5, an example of a linear function V(n) is illustrated which intersects the voltage axis at the bias voltage V0, and having a linear slope that is smaller than the linear slope of the characteristic voltage curve Vch. Accordingly, the two curves V(n) and Vch intersect at a particular rotational speed, which corresponds to a target rotational speed n_target.

For example, the slope of the driving voltage V(n) may be 20% to 99%, or 30 to 95%, or 40% to 90% of the slope of the characteristic voltage curve Vch. In further examples, the driving voltage V(n) may be quasi constant, or the slope of the driving voltage V(n) may be relatively small. Here, the driving voltage V(n) being nearly constant may refer to a relative change of the driving voltage V(n) by less than 20%, or less than 10%, or less than 5% over a relevant range of the rotational speed of the electric motor 304. Alternatively or additionally, the slope of the driving voltage V(n) being relatively small may refer to a relative change of the driving voltage V(n) by less than 20%, or less than 10%, or less than 5% while the rotational speed n of the electric motor 302 is doubled.

In a specific example, the bias voltage V0 may be greater than the constant C, and the driving voltage V(n) may be controlled to increase linearly with the rotational speed n of the electric motor 304 increasing, wherein the linear increase of the driving voltage V(n) is smaller than the linear increase of the characteristic function Vch of the electric motor 304, as illustrated in FIG. 5. According to this specific example, when the current rotational speed n of the electric motor 304 is below the target rotational speed n_target, the driving voltage V(n) may be greater than the characteristic voltage Vch such that the electric motor 304 is accelerated. Similarly, when the current rotational speed n of the electric motor 304 is above the target rotational speed n_target, the driving voltage V(n) may be smaller than the characteristic voltage Vch such as not to accelerate the electric motor 304. When the current rotational speed n of the electric motor 304 is near or equal to the target rotational speed n_target, the driving voltage V(n) applied to the electric motor 304 may be close or equal to the characteristic voltage Vch, thereby maintaining the rotational speed n of the electric motor 304 at the target rotational speed n_target. Since the roller 302 mechanically coupled to the electric motor 304, a rotational speed of the roller 302 may be maintained at a corresponding target speed.

Figure 6A:
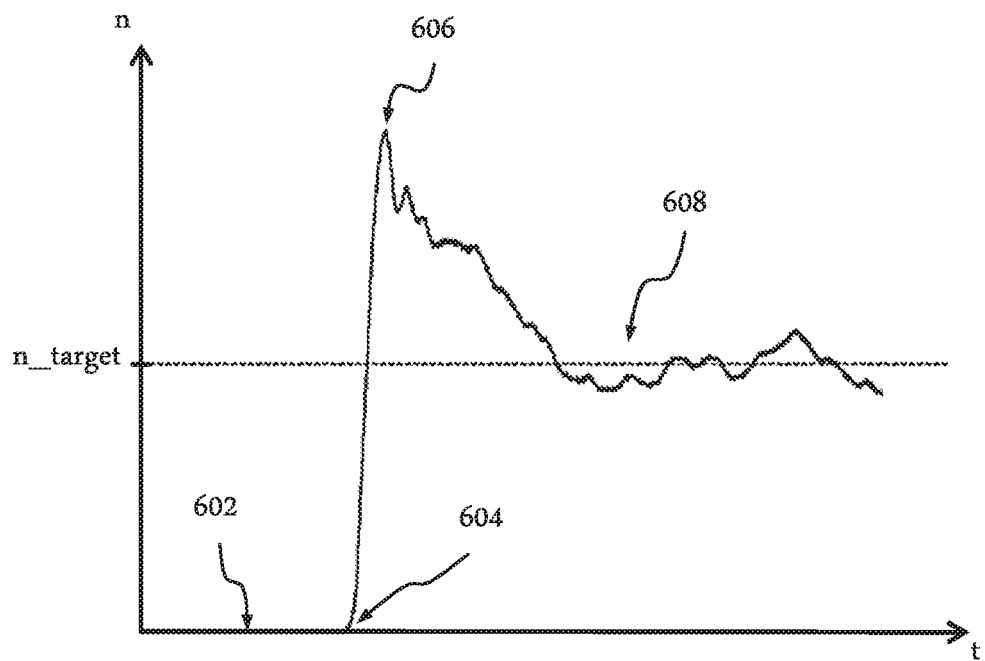
FIGS. 6A and 6B are schematic time-dependent diagrams of a rotational speed according to an example.
Figure 6B:
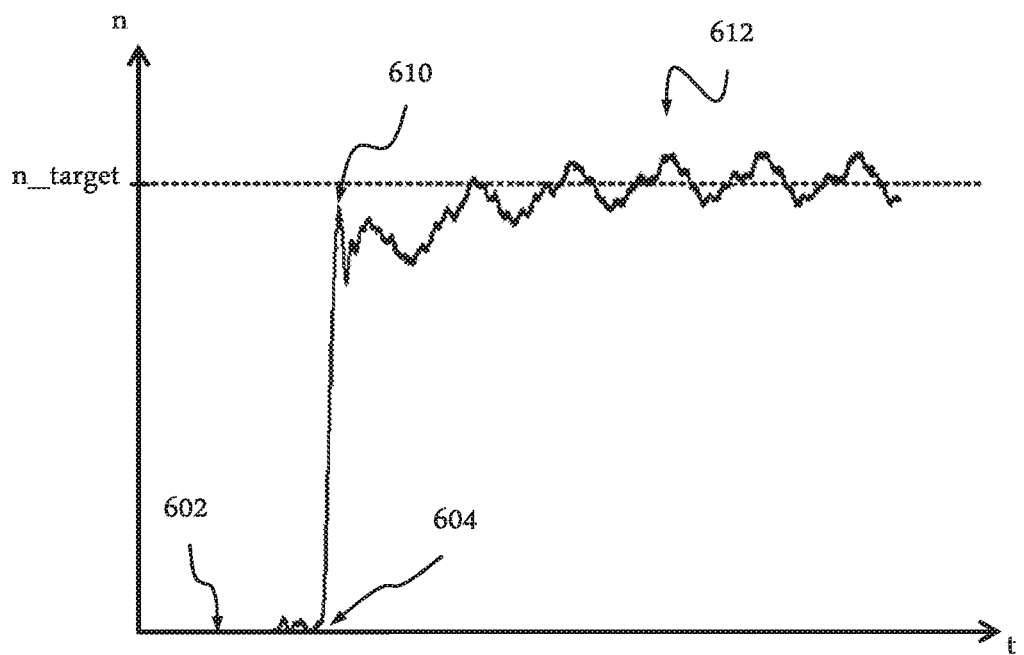

FIGS. 6A and 6B illustrate examples of the rotational speed n in time-dependent diagrams in which t denotes an elapsed time. In the examples shown in FIGS. 6A and 6B, the driving voltage V(n) may be applied in the manner described with reference to FIG. 5. Since FIGS. 6A and 6B show schematic diagrams, the time-dependent rotational speed n illustrated therein may refer to either of the rotational speed of the electric motor 304 or the rotational speed of the roller 302.

In an initial phase 602, the roller 302 and the electric motor 304 may be idle and not moving, which may be indicated by the rotational speed n being at zero. At 604, an external force E may be applied to rotate the roller 302. In response, a driving voltage V(n) may be applied to the electric motor 304. As a result, the electric motor 304 may generate and apply an assisting force F to the roller 302 to further increase the rotational speed n.

Referring to FIG. 6A, the driving voltage V(n) may be applied such that the rotational speed n exceeds the target rotational speed n_target. Accordingly, the driving voltage V(n) may be controlled to be below the characteristic function Vch such that the rotational speed n does not further increase. In FIG. 6A, reference sign 606 may indicate a turning point at which the driving voltage V(n) may be adjusted to be below the characteristic function Vch. As described above, the driving voltage V(n) may be controlled by the control unit 306.

The rotational speed n may decrease as long as the driving voltage V(n) is maintained below the characteristic function Vch. Once the rotational speed n has been determined to fall below the target rotational speed n_target, as indicated by reference sign 608 in FIG. 6A, the driving voltage V(n) may be adjusted so as to maintain the target rotational speed n_target. For example, a feed loop may be coupled to the control unit 306 to provide a signal according to the current rotational speed n in real time, for example at regular time intervals. Accordingly, the control unit may adjust the driving voltage V(n) at regular time intervals.

In a further examples shown in FIG. 6B, the roller 302 and the electric motor 304 may be idle in the initial phase 602 as described above with reference to FIG. 6A, and the rotation of the roller 302 may be detected at 604. In response, the assisting force F may be applied such as to increase the rotational speed n close to the target rotational speed n_taget, as indicated by reference sign 610 in FIG. 6B. In a subsequent phase 612, the driving voltage V(n) may be adjusted at regular time intervals such as to maintain the rotational speed n at the target rotational speed n_target.

As shown in FIGS. 6A and 6B, the driving voltage V(n) may be applied in pulses. In other examples, the driving voltage V(n) may be applied permanently or in terms of an adjustable duty cycle. The driving voltage V(n) may be applied according to various waveforms, such as a sine, square, triangle, sawtooth waveform, or any combination thereof.

The linear curve as shown in FIG. 5 is an example. Although not explicitly shown in the drawings, the driving voltage V(n) may be applied according to an exponential function, a polynomial function including a different linear function, a logarithmic function, or the like, or a combination thereof. The driving voltage V(n) may be applied according to any mathematical function of the current rotational speed n of the electric motor 304 that is monotonically increasing and intersects the characteristic function Vch at the target rotational speed n_target. Accordingly, the electric motor 304 may be driven in a way to automatically aspire the target rotational speed n_target. Furthermore, the mathematical function for the driving voltage V(n) as well as the target rotational speed n_target may be customizable according to the user requirements and user convenience. Furthermore, the bias voltage V0 may be below, substantially equal to, or above the constant C depending on individual demands of the respective device. The bias voltage V0 may be above zero to support an initial rotation of the roller 302 by the external force E. In particular, the support for an initial rotation of the roller 302 caused by the external force E may customizable by adjusting the bias voltage V0.

In some examples, the control unit 306 may control the electric motor 304 such that the electric motor 304 maintains its current rotational speed n, thereby maintaining the current rotational speed of the roller 302.

Figure 7:
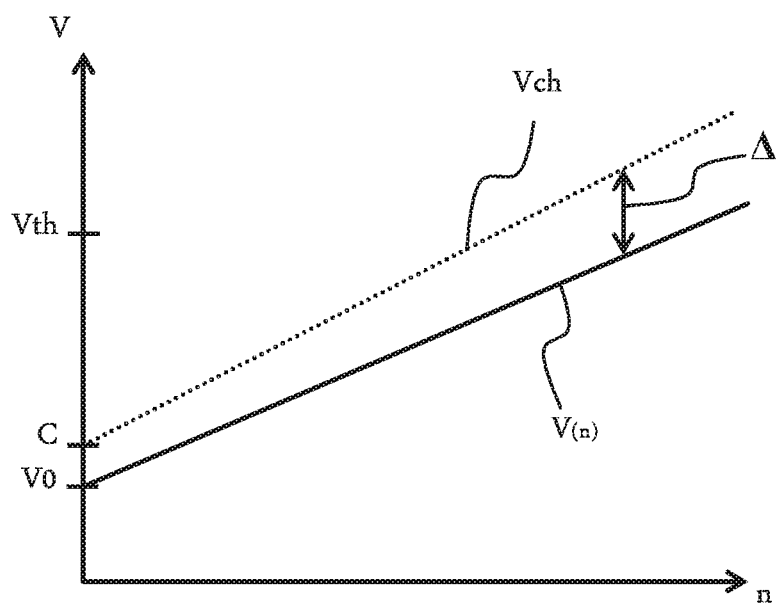
FIG. 7 is a schematic diagram of a voltage applied to an electric motor as a function of a rotational speed of the electric motor according to an example.

In particular, the driving voltage V(n) may be controlled according to a superposition of an offset function A and the characteristic function Vch of the electric motor 304. For example, the offset function A may linearly increase with the current rotational speed n of the electric motor 302 increasing, as shown in FIG. 7. Accordingly, assuming that the characteristic function Vch is linear function of the rotational speed n, the driving voltage V(n) may be a linear function of rotational speed n with a slope that is different from the slope of the characteristic function Vch. In particular, the slope of the driving voltage V(n) may be smaller than the slope of the characteristic function Vch, as shown in FIG. 7.

Figure 8:
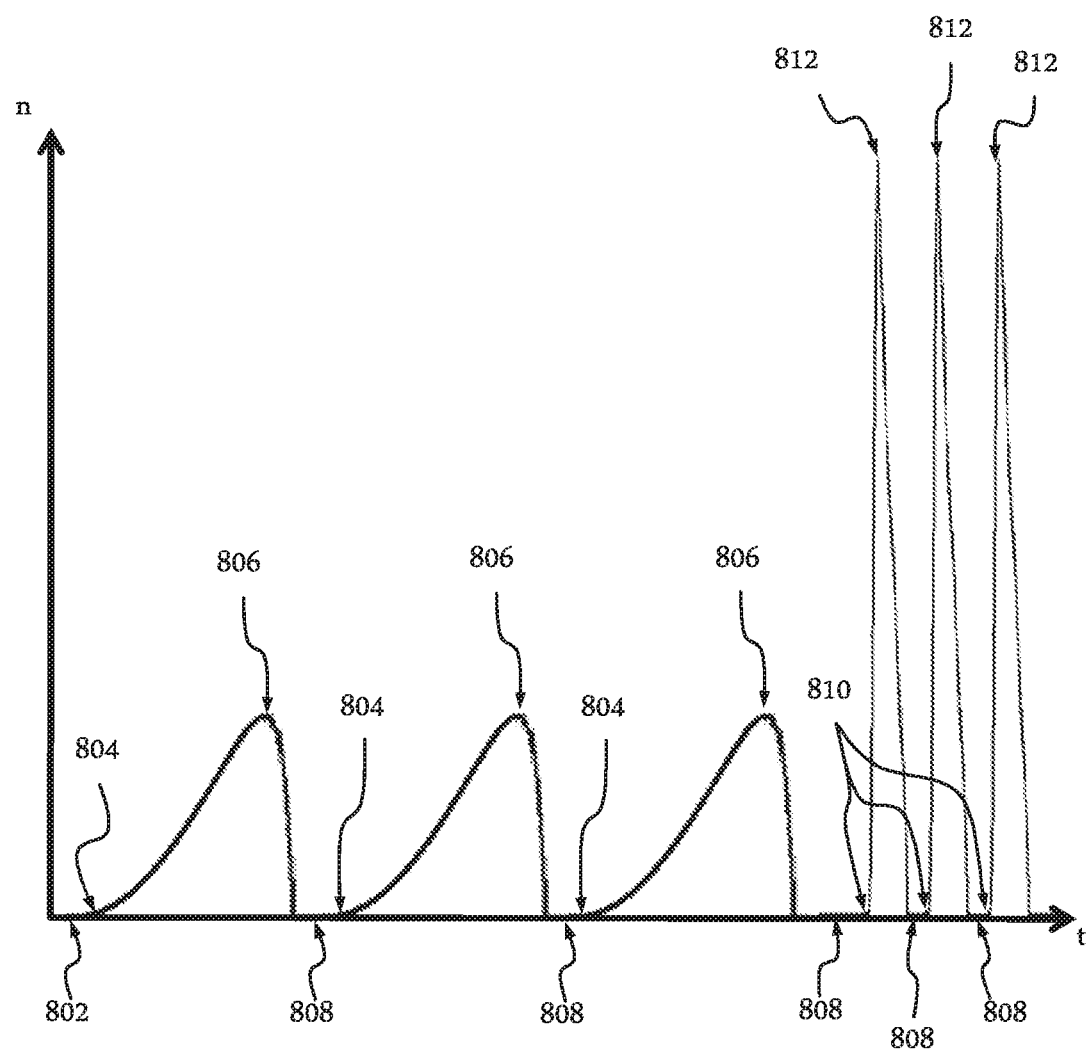
FIG. 8 is a schematic time-dependent diagram of a rotational speed according to an example.

FIG. 8 illustrates examples of the rotational speed n in a time-dependent diagram in which t denotes an elapsed time. In the examples shown in FIG. 8, the driving voltage V(n) may be applied in the manner described with reference to FIG. 7.

The roller 302 and the electric motor 304 may be idle in an initial phase 802. In response to receiving an external force E that rotates the roller 302, the driving voltage V(n) may be applied to generate the assisting force F to further rotate the roller 302 as described above. At 804, the external force E rotating the roller 302 may be relatively small and exerted over a relatively long period of time. For example, this may correspond to a user gently rolling the roller 302 with his hand resting on the roller 302. As a result, the rotational speed n may increase relatively slowly, i.e. with a relatively small slope, up to an apex at 806. When the external force E ceases, the driving voltage V(n) and thus the assisting force F may be decreased, which causes the rotational speed n to decrease, for example due to the inertia and friction. As indicated by idle phases 808 in FIG. 8, the rotational speed n may decrease to zero unless the assisting force F is applied again.

At 810, the external force E rotating the roller 302 may be relatively strong and exerted over a relatively short period of time. For example, this may correspond to a user rotating the roller 302 forcefully and impulsively with short touches. As a result, the rotational speed n may increase relatively rapidly, i.e. with a relatively steep slope, up to an apex at 812 that is higher than the apexes 806. When the external force E ceases, the driving voltage V(n) and thus the assisting force F may be decreased, which causes the rotational speed n to decrease, for example due to the inertia and friction. As indicated by idle phases 808 in FIG. 8, the rotational speed n may decrease to zero unless the assisting force F is applied again.

Figure 9:
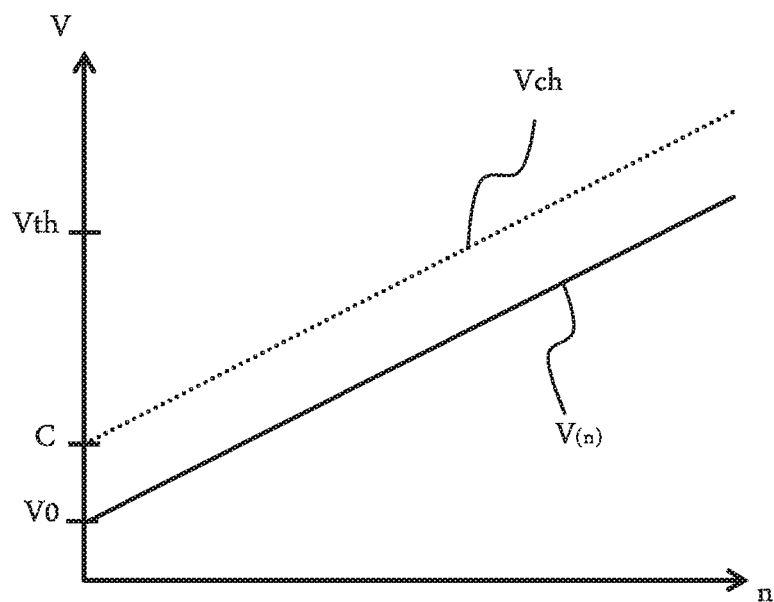
FIG. 9 is a schematic diagram of a voltage applied to an electric motor as a function of a rotational speed of the electric motor according to an example.

In further examples, the driving voltage V(n) may be controlled according to a function that is offset from the characteristic function by a constant, as shown in FIG. 9. Accordingly, the driving voltage V(n) may have a slope that is substantially same with the slope of the characteristic function Vch. In this example, the bias voltage V0 may be applied if the electric motor 304 is in a non-moving state and may not be applied otherwise. While the electric motor 304 is in a moving state, the driving voltage V(n) may increase linearly, however below the characteristic curve Vch such that the electric motor 304 may eventually stop if no external force rotating the roller 302 is received.

Figure 10:
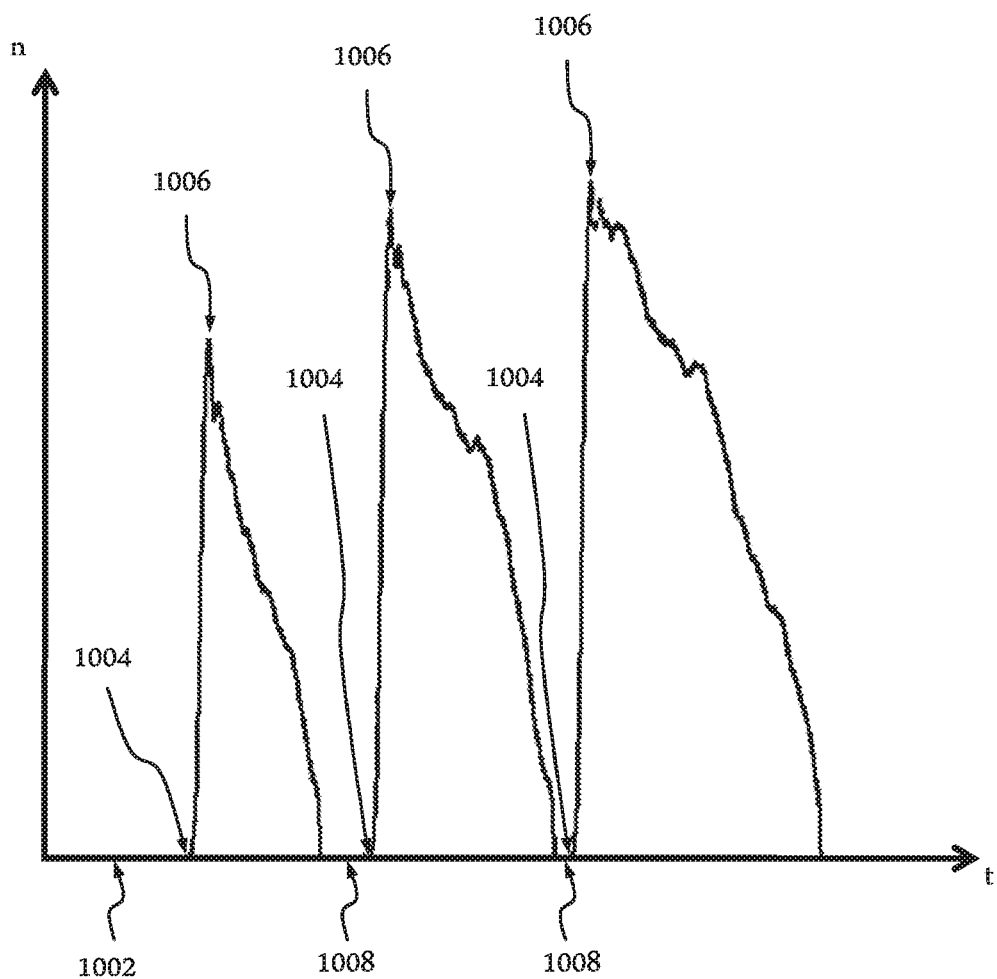
FIG. 10 is a schematic time-dependent diagram of a rotational speed according to an example.

FIG. 10 illustrates an example of the rotational speed n in a time-dependent diagram in which t denotes an elapsed time. In the example shown in FIG. 10, the driving voltage V(n) may be applied in the above described manner with reference to FIG. 9.

The roller 302 and the electric motor 304 may be idle in an initial phase 1002. In response to receiving an external force E that rotates the roller 302, the driving voltage V(n) may be applied to generate the assisting force F to further rotate the roller 302 as described above. At 1004, the external force E rotating the roller 302 may be relatively strong and exerted over a relatively short period of time, as described above with reference to the latter example of FIG. 9. Accordingly, the rotational speed n may increase relatively rapidly with a relatively steep slope up to an apex at 1006. When the external force E ceases, the driving voltage V(n) and thus the assisting force F may be decreased, which causes the rotational speed n to decrease, for example due to the inertia and friction. As indicated by idle phases 1008 in FIG. 10, the rotational speed n may decrease to zero unless the assisting force F is applied again. In comparison to the examples described above with reference to FIG. 8, the decrease of the rotational speed n may be relatively slower due to the applied driving voltage V(n) being slightly higher than the driving voltage V(n) applied in the examples shown in FIG. 7 and FIG. 8.

According to an example, while the roller 302 is rotating, the assisting force F applied by the electric motor 304 may be decreased in response to at least one of: a predefined amount of the print medium P being received by the roller 302, receiving a further external force exerted on the roller 302 directed opposite a rotation direction of the roller 302, and the roller 302 rotating for a predefined time period.

The examples described herein may allow a user to control a receiving device to receive a print medium in an accurately adjustable manner. In particular, the user may be able to adjust a speed of receiving a print medium in real time. Furthermore, the examples described herein may provide the receiving process of a print medium to be intuitive for a user. Accordingly, the user convenience when the receiving process of a print medium may be increased. Furthermore, the examples described herein may not require a switch circuit for the receiving process of a print medium, thereby allowing for reducing cost and maintenance related thereto.

The invention claimed is:

1. A method, comprising:
   detecting rotation of a receiving device to receive a print medium, the rotation being caused by an external force;
   applying an assisting force to further rotate the receiving device in response to the detected rotation;
   providing an electric motor to generate the assisting force;
   determining a current rotational speed of the electric motor; and
   in response to detecting the rotation of the receiving device caused by the external force, applying a driving voltage to the electric motor to generate the assisting force,
   wherein the driving voltage is a function of the current rotational speed of the electric motor, the function differing from a characteristic function of the electric motor and the characteristic function defining a rotational speed as a function of applied voltage, and
   wherein the rotation of the receiving device is detected by detecting motion of the electric motor caused by the external force.

2. The method of claim 1, further comprising
   before detecting the motion of the electric motor, applying a bias voltage to the electric motor,
   wherein the electric motor is to set in motion when powered at least by a threshold voltage; and
   wherein the bias voltage is below the threshold voltage.

3. The method of claim 2,
   wherein the bias voltage is a function of at least one of:
   ohmic resistance of the electric motor;
   electromagnetic inertia of the electric motor;
   rotational inertia of the electric motor;

static friction of the electric motor; and
load torque on a reel device.

4. The method of claim 1, further comprising
determining a target rotational speed of the electric motor;
if the current rotational speed of the electric motor is below the target rotational speed, controlling the driving voltage to be above the voltage according to the characteristic function; and
if the current rotational speed of the electric motor is above the target rotational speed, controlling the driving voltage to be below the voltage according to the characteristic function.

5. The method of claim 1, further comprising
controlling the driving voltage according to a superposition of an offset function and the characteristic function of the electric motor.

6. The method of claim 5,
wherein the offset function is constant or a linear function of the current rotational speed.

7. The method of claim 5,
wherein the characteristic function of the electric motor is a linear function.

8. A method, comprising:
detecting rotation of a receiving device to receive a print medium, the rotation being caused by an external force; and
applying an assisting force to further rotate the receiving device in response to the detected rotation,
wherein the assisting force is generated by applying a driving voltage to an electric motor, and
wherein, while the receiving device is rotating, decreasing the assisting force in response to at least one of:
a predefined amount of the print medium being received by the receiving device;
receiving a further external force exerted on the receiving device directed opposite to a rotation direction of the receiving device; and
the receiving device rotating for a predefined time period.

9. A method, comprising
providing a receiving roller to receive a print medium and an electric motor to rotate the receiving roller;
applying a bias voltage to the electric motor, wherein the bias voltage is below a threshold voltage, wherein the electric motor is to set in motion when powered at least by the threshold voltage;
detecting rotation of the receiving roller caused by an external force;
in response to detecting the rotation of the receiving roller, applying a driving voltage to the electric motor to generate an assisting force to further rotate the receiving roller;
determining a current rotational speed of the receiving roller; and
controlling the driving voltage according to a predefined function of the current rotational speed of the receiving roller.

10. A device, comprising
a receiving device to receive a print medium;
an actuator to apply an assisting force to the receiving device when a driving voltage is applied to the actuator; and
a control unit to control the actuator, detect rotation of the receiving device, and determine a current rotational speed of the actuator;
wherein the control unit is to operate the actuator in response to detecting the rotation of the receiving device caused by an external force, and
wherein the driving voltage is a function of the current rotational speed of the actuator, the function differing from a characteristic function of the actuator and the characteristic function defining a rotational speed as a function of applied voltage.

11. The device of claim 10,
wherein the actuator is an electric motor to be operated according to a driving voltage applied thereto, the electric motor being mechanically coupled to the receiving device,
wherein the control unit is to detect an induced voltage at the electric motor caused by the rotation of the receiving device caused by the external force.

12. The device of claim 10,
wherein the control unit is further to determine a current rotational speed of the receiving device,
wherein the control unit is further to control the actuator such that the receiving device operates at a target rotational speed, or
wherein the control unit is further to control the actuator such that the receiving device maintains a current rotational speed.

13. The device of claim 10, further comprising
a print zone, in which a print fluid is to be deposited onto a print medium,
wherein the receiving device is arranged at an output of the print zone to receive the print medium advancing from the print zone.

* * * * *